Nov. 4, 1952   B. C. J. KULLGREN   2,616,937
ALKALINE ACCUMULATOR
Filed May 29, 1950
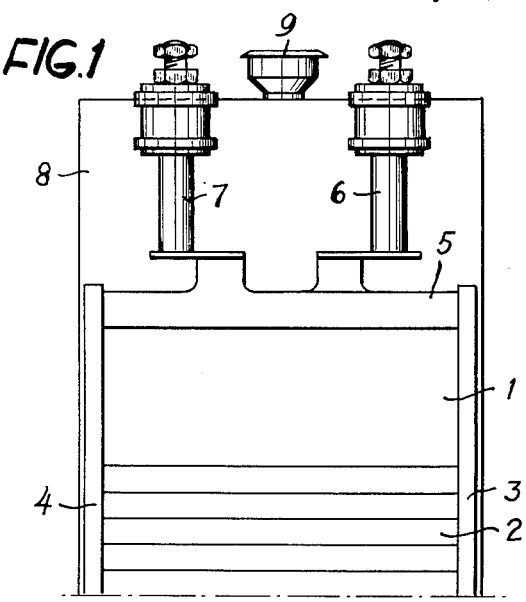
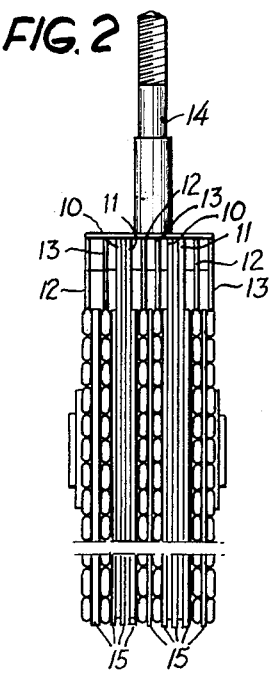
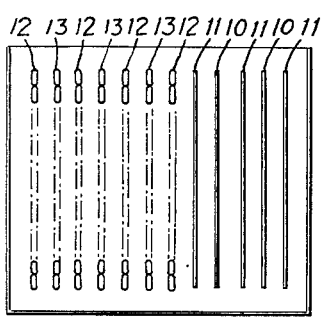
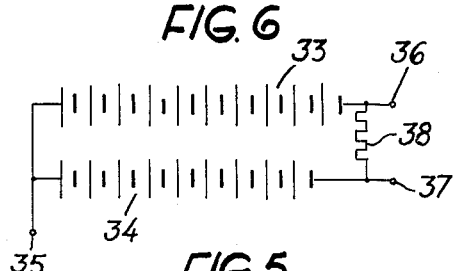
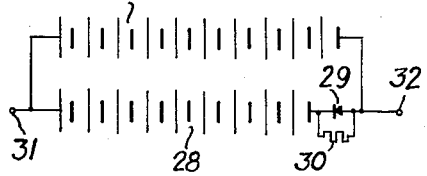
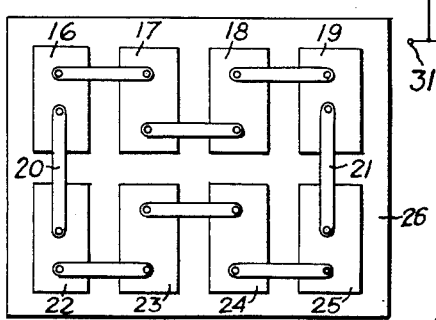
INVENTOR:
Bjarne Cecil Josef Kullgren,
BY Pierce, Scheffler & Parker,
ATTORNEYS.

Patented Nov. 4, 1952

2,616,937

UNITED STATES PATENT OFFICE 2,616,937

ALKALINE ACCUMULATOR

Bjarne Cecil Josef Kullgren, Stockholm, Sweden, assignor to Svenska Ackumulator Aktiebolaget Jungner, Stockholm, Sweden, a corporation of Sweden Application May 29, 1950, Serial No. 164,927
In Sweden May 25, 1949

11 Claims. (Cl. 136—6)

It is known that an alkaline accumulator constructed for a large discharge current with respect to the ampere-hour capacity will always become of greater weight per ampere-hour than an accumulator for a small discharge current relatively to the ampere-hour capacity. Accumulators called upon to endure a strong discharge current during a very short time and, alternately, a weaker current during a long time, consequently become very large and heavy when constructed in the conventional manner.

Through the present invention it will be possible to provide an accumulator of a considerably lesser total weight and volume, while still permitting of being loaded with very large currents and holding an ample capacity when discharged by a weak current. The invention is principally distinguished by the feature that the accumulator contains, first, cells or cell parts of a small internal resistance and, perhaps, a relatively small capacity, and, second, cells or cell parts of a greater internal resistance and a comparatively large capacity. In one form of embodiment in accordance with the invention, the accumulator contains plates, each one of which comprises a portion of a small internal resistance and a low capacity and another portion of a greater internal resistance and a large capacity.

In a further embodiment, each cell of the accumulator contains plates of a small internal resistance and a low capacity as well as plates of a greater internal resistance and a large capacity. A third embodiment contains two batteries connected in parallel and consisting each of one or more series-connected cells, one of the batteries having a small internal resistance—low ohmic value—and a relatively small capacity, whereas the other battery has a greater internal resistance—high ohmic value—and a large capacity. In accumulators according to the invention, the distribution of the loading current between the portion of low internal resistance and the portion of high internal resistance will vary with the strength of the current. With the strong current, almost the whole of the current passes through the portion of low internal resistance, whereas the portion of high internal resistance yields a greater part of the total current when the load is low. If a strong current is taken off the accumulator during a space of time so long that a considerable proportion of the capacity of the portion of low internal resistance has been consumed, and the load is then interrupted or reduced to a low value, the portion of high internal resistance will partly charge the portion of low internal resistance. For this reason it will be possible to take off a strong current pulse repeatedly during a short space of time, if the accumulator is permitted to stand unloaded or slightly loaded for some time between the current pulses. It will thus be possible between every charging period of the whole battery to take off a total quantity of energy at a high output, which is considerably larger than the capacity of the portion of low internal resistance. For this reason an accumulator according to the invention is very suitable, for instance, as a starting battery for motor vehicles. It may be found suitable to devise the two portions with the use of electrode materials giving varying electromotive forces. To attain discharging properties as favourable as possible, the cells or cell parts having a small internal resistance may be constructed with an electrode mass yielding a somewhat lower electromotive force than those portions that have a great internal resistance. Hereby the advantage is obtained that the portion of the accumulator having a great internal resistance will have a greater load in connection with a weak current. With a stronger loading current, on the other hand, the portion having a small internal resistance will still take the greatest portion of the current. Furthermore, a somewhat higher charging of the portion of low internal resistance may thus take place during the periods of rest. In charging, on the other hand, the portion of low internal resistance should yield a higher countertension than the portion of high internal resistance. The same discharging properties may be obtained by means of an accumulator according to the third of said embodiments, i. e. by the two accumulators connected in parallel being made with different numbers of cells. For example, if ten series-connected cells of high internal resistance are connected in parallel with nine series-connected cells of low internal resistance, the cell portion of low internal resistance will always be maintained practically charged to its full capacity by the portion of high internal resistance, and with a weak loading current only the portion of high internal resistance will yield current. With a high load, on the other hand, the voltage drop in the portion of high internal resistance becomes so great by reason of the internal resistance that the portion of low internal resistance will yield the greatest portion of the current. If the loading is again interrupted, the portion of high internal resistance will charge the one of low internal resistance. Hereby the portion of low internal resistance of the battery will be maintained fully charged after a period of rest, until the portion of high internal resistance is practically entirely discharged. A drawback of this arrangement is that in charging only the portion of low internal resistance will be charged, to begin with. After that, the portion of high internal resistance will be charged, but at the same time a considerable current flows through the fully charged portion of low internal resistance, so that a lively development of gas will take place in the latter portion. This disadvantage can be eliminated, or counteracted at least, if a resistance element having different resistance values in the two conducting directions is connected in series with the one portion, such resistance element consisting, for instance, of a dry-rectifier plate. As in this case said plate is desired to have a very low resistance value in comparison with the conditions of ordinary rectifiers, whereas a very great difference is not required between the conducting resistance value and the impeding resistance value, the rectifier might be shunted with an ohmic resistance, if desired.

As an electrode structure providing a low internal resistance one may use an electrode consisting of a thin plate of a suitable material, such as nickel, which is covered on both sides with a porous metallic layer obtained, for instance, by the sintering of fine-grained metal powder, such as nickel powder. Such powder may be obtained by decomposing the corresponding metal carbonyl. The porous metallic layer may be taken to be impregnated by active material according to some known method. Here, the positive plates may contain nickel hydroxide and the negative plates cadmium or a mixture of cadmium and iron or their oxides or hydroxides. The high internal resistance part of the cell may contain pockets or tubes with an active material of some known construction.

The invention will be further elucidated in the following description of a few forms of embodiment of the same with reference to the accompanying drawings comprising Figures 1-6. Of these figures, Fig. 1 is an elevation of a cell with electrodes, each consisting of a portion of a high internal resistance and a large capacity and of a portion having a low internal resistance and a small capacity. Figs. 2 and 3 show sections of accumulators provided, first, with electrodes of a high internal resistance and a large capacity and, second, with electrodes of a low internal resistance and a small capacity, said electrodes being arranged in various ways relatively to each other. Fig. 4 shows a battery comprising a high internal resistance portion and a low internal resistance portion, each of them containing series-connected cells, whereas the portions themselves are connected in parallel. Figs. 5 and 6 are diagrammatic representations of two connecting schemes according to the invention.

In Fig. 1, 1 designates an electrode portion having a low internal resistance, while 2 denotes an electrode portion having a high internal resistance. These electrode portions are kept together mechanically and are electrically connected with the outer circuit with the aid of two longitudinally extending bus bars 3 and 4 connected at their upper ends by means of a transversely extending bar 5 provided with a connecting lug. Said parts may be joined for instance with the aid of resistance welding. The positive electrodes are connected to a pole bolt 6 and the negative ones to a pole bolt 7. The whole electrode structure is enclosed within a vessel 8 provided with a valve 9, which parts may be of known construction. In Fig. 2, 10 and 11 designate a number of positive and negative electrodes, respectively, of a low internal resistance, while 12 and 13 denote positive and negative electrodes, respectively, of a high internal resistance. These electrodes are mutually arranged with each other pair of electrodes comprising electrodes of a low internal resistance, and with each other pair of electrodes comprising electrodes of a high internal resistance. The electrodes are mounted together by means of current supplying bolts 14 (one of which is concealed by the other in the figure) and are separated by means of so-called separators 15.

Fig. 3 shows a further example of the arrangement of the electrodes in an accumulator cell. Here, all electrodes of a high internal resistance are brought together in one portion of the vessel, while those of a low internal resistance are brought together in another portion of the vessel. The numerals 10—13 in Fig. 3 refer to the same parts as the corresponding numerals in Fig. 2.

Fig. 4 shows a construction comprising a number of cells containing electrodes 16—19 of a high internal resistance and a large capacity, which are connected in series. Connected in parallel with this battery by means of connecting bars 20—21 is another battery containing electrodes 22—25 of a low internal resistance and a small capacity. Here, the two portions connected in parallel have the same number of cells. They are mounted in a vessel 26 in such manner that the cells are insulated from each other. If desired, the vessel 26 may consist of a so-called block vessel, that is to say a vessel of insulating material provided with recesses for the cells, in which case the electrode systems are mounted in said recesses, into which the electrolyte is filled in directly.

Fig. 5 is a diagrammatic representation of an arrangement comprising two batteries connected in parallel, each of them comprising series-connected cells and containing different numbers of cells. 27 denotes a battery comprising ten cells of high internal resistance, and 28 designates a battery comprising nine cells of low internal resistance. Connected in series with this battery is a connecting arrangement comprising a rectifier 29 connected in parallel with the resistance 30. If found suitable, the resistance 30 may be omitted. 31 and 32 designate the terminals of the battery.

Fig. 6 shows a further connecting arrangement with batteries comprising different numbers of cells. 33 designates a battery comprising ten cells of high internal resistance, and 34 denotes a battery comprising nine cells of low internal resistance. The one poles of the same, for instance the plus poles, are connected to each other and to a connecting terminal 35. The other poles of the battery are connected each to a connecting terminal 36 and 37, respectively, and connected between them is a resistance 38. Here, the terminals 35—37 are intended for the discharging of the battery, while the terminals 36 and 35 are intended for charging.

The mode of operation of the connecting arrangement according to Fig. 5 is as follows. In charging, the charging current is distributed between the batteries 27 and 28 in a manner determined by the opposing electromotive force and the total resistance value of each battery together with the rectifier and the then occurrent direction of the current. Here, the rectifier 29 has for its object to reduce the current through the battery 28 of low internal resistance, which preferably has a capacity considerably lower than that of the battery 27. At the same time it has a lower opposing electromotive force and a lower internal resistance. If the rectifier 29 were not connected in series with the battery 28, the latter would become completely charged in a very short time and would then cause an intense development of gas, while the battery 27 was subjected to charging. By suitably dimensioning the combined resistance value of the rectifier 29 and of the resistance 30 in the impeding direction, the current through the battery 28 will be limited so that the batteries 27 and 28 become completely charged practically at the same time. In discharging with a weak current, the battery 27 is the one which mainly will yield current by reason of its greater electromotive force. At a great load, on the other hand, the greatest portion of the current is assumed by the battery 28 on account of the lower internal resistance of this battery. The rectifier 29 with its shunt 30 is thus to have a resistance value in this direction which is considerably lower than that of the battery 28.

The arrangement according to Fig. 6 operates in the following manner. In charging the battery with the aid of the terminals 35 and 36, the resistance 38 is in series with the battery 34. The resistance 38 shall be so dimensioned that the batteries 33 and 34 become completely charged practically at the same time. If the resistance 38 is too small, the battery 34 will be completely charged too early. If it is too great, on the other hand, the risk is incurred of the battery 34 becoming inferiorly charged. With respect to the discharging conditions it should not be chosen too great, however. In discharging by means of the connecting terminals 35—37, the battery 33 will, in connection with a weak loading current, be substantially called upon, as in the preceding case, to deliver current by reason of its higher electromotive force. In discharging with a strong current, on the other hand, the battery 34 will assume the greatest portion of the current. Here, the point where the batteries deliver the same current (or a current proportional to the capacity of each battery) will vary with the resistance 38. The greater this resistance is, at a current so much smaller will the battery 34 assume the main portion of the current. In most cases, a suitable value of the resistance 38 can be found, which ensures favourable charging and discharging conditions. It is also possible to connect the arrangements requiring a strong current in discharging to the terminals 35—37, while the charging arrangement and the objects requiring a weak current may be connected to the terminals 35—36.

What I claim is:

1. An alkaline accumulator comprising two complementary accumulator components of different types, one accumulator component being of low ampere-hour capacity and low internal resistance, the other accumulator component being of high ampere-hour capacity and high internal resistance, output terminals for said accumulator and means permanently connecting said complementary accumulator components in parallel between said terminals.

2. An alkaline accumulator as recited in claim 1, wherein said accumulator comprises a cell having sets of interleaved electrodes of opposite polarity in an alkaline electrolyte, and said accumulator components of different types comprise different portions of each of said electrodes of both sets.

3. An alkaline accumulator as recited in claim 1, wherein said accumulator comprises a cell having sets of interleaved electrodes of opposite polarity in an alkaline electrolyte, and said accumulator components of different types each comprise a plurality of said interleaved electrodes.

4. An alkaline accumulator as recited in claim 1, wherein said accumulator component of low internal resistance comprises thin metal plate electrodes covered with a porous layer of sintered metal powder impregnated with an active material.

5. An alkaline accumulator as recited in claim 1, wherein said accumulator components of different types comprise electrode assemblies with active materials yielding different electromotive forces, the active material of the electrode assemblies of the accumlator component of higher internal resistance yielding a higher electromotive force than the active material of the electrode assemblies of the accumulator component of low internal resistance.

6. An accumulator as recited in claim 1, wherein each accumulator component comprises a battery of serially connected cells.

7. An alkaline accumulator as recited in claim 6, wherein the accumulator component of low internal resistance comprises a lesser number of cells than said accumulator component of high internal resistance.

8. An alkaline accumulator as recited in claim 7, wherein said means permanently connecting said accumulator components between said output terminals includes an asymmetric resistance in series with said battery of serially connected cells comprising said accumulator component of low internal resistance.

9. An alkaline accumulator as recited in claim 7, wherein said means permanently connecting said accumulator components between said output terminals includes a dry-plate rectifier in series with said battery of serially connected cells comprising said accumulator component of low internal resistance.

10. An alkaline accumulator as recited in claim 7, wherein said means permanently connecting said accumulator components between said output terminals includes a dry-plate rectifier and shunt ohmic resistance in series with said battery of serially connected cells comprising said accumulator component of low internal resistance.

11. An alkaline accumulator as recited in claim 7, wherein said connecting means includes means connecting one set of like polarity terminals of said batteries to a first output terminal, means connecting the other terminal of the battery of low internal resistance to the second output terminal, and a resistance between the other terminal of the battery of high internal resistance and said second output terminal; in combination with a charging terminal connected to said other terminal of said battery of high internal resistance; said first output terminal constituting the cooperating charging terminal.

BJARNE CECIL JOSEF KULLGREN.

REFERENCES CITED

The following references are of record in the file of this patent:

UNITED STATES PATENTS

| Number | Name | Date |
|---|---|---|
| 979,154 | Gugler | Dec. 20, 1910 |
| 1,998,788 | Pautou | Apr. 23, 1935 |
| 2,066,010 | Lindem | Dec. 29, 1936 |